United States Patent
Yang

(10) Patent No.: US 10,812,749 B2
(45) Date of Patent: Oct. 20, 2020

(54) DUAL-POLARIZED OMNIDIRECTIONAL ANTENNA

(71) Applicant: SHENZHEN ANTOP TECHNOLOGY CO., LTD., Shenzhen, Guangdong (CN)

(72) Inventor: Ruidian Yang, Shenzhen (CN)

(73) Assignee: SHENZHEN ANTOP TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/432,128

(22) Filed: Jun. 5, 2019

(65) Prior Publication Data

US 2019/0289247 A1    Sep. 19, 2019

Related U.S. Application Data

(63) Continuation of application No. PCT/CN2017/091766, filed on Jul. 5, 2017.

(30) Foreign Application Priority Data

Jun. 19, 2017  (CN) .......................... 2017 1 0466226
Jun. 19, 2017  (CN) ....................... 2017 2 0713462 U

(51) Int. Cl.
*H01Q 5/30*   (2015.01)
*H04N 5/46*   (2006.01)
(Continued)

(52) U.S. Cl.
CPC ............... *H04N 5/46* (2013.01); *H01Q 1/241* (2013.01); *H01Q 1/36* (2013.01); *H01Q 1/42* (2013.01);
(Continued)

(58) Field of Classification Search
CPC .. H01Q 5/30; H01Q 1/24; H01Q 1/36; H01Q 1/42; H01Q 1/52; H01Q 7/00; H01Q 21/24
(Continued)

(56) References Cited

U.S. PATENT DOCUMENTS

2013/0215832 A1*  8/2013  Gao .......................... H01Q 9/26
                                                            370/328

FOREIGN PATENT DOCUMENTS

| CN | 2549673 Y    | 5/2003 |
| CN | 2017-97043 U | 4/2011 |
| CN | 205944411 U  | 2/2017 |

OTHER PUBLICATIONS

International Search Report Issued in Patent Application No. PCT/CN2017/091766 dated Feb. 23, 2018.
(Continued)

*Primary Examiner* — Andrea Lindgren Baltzell
(74) *Attorney, Agent, or Firm* — Pearne & Gordon LLP

(57) ABSTRACT

A dual-polarized omnidirectional antenna, which includes a vertically polarized antenna and a loop horizontally polarized antenna. The vertically polarized antenna includes a vertical fixed cover and a cylindrical antenna which is fixedly mounted in the vertical fixed cover. The horizontally polarized antenna includes a horizontal fixed cover and a loop antenna which is fixedly mounted in the horizontal fixing cover. The vertical fixed cover is fixedly mounted on the horizontal fixed cover. The cylindrical antenna receives the vertically polarized signal, and the loop antenna receives the horizontally polarized signal. The loop antenna can also receive the horizontally polarized signal omnidirectionally at the same time to ensure a better receiving effect.

10 Claims, 15 Drawing Sheets

(51) Int. Cl.
  *H01Q 1/24*   (2006.01)
  *H01Q 1/42*   (2006.01)
  *H01Q 1/52*   (2006.01)
  *H01Q 7/00*   (2006.01)
  *H01Q 21/24*  (2006.01)
  *H04B 1/18*   (2006.01)
  *H01Q 1/36*   (2006.01)
(52) U.S. Cl.
  CPC ............... *H01Q 1/526* (2013.01); *H01Q 5/30* (2015.01); *H01Q 7/00* (2013.01); *H01Q 21/24* (2013.01); *H04B 1/18* (2013.01)
(58) Field of Classification Search
  USPC .......................................................... 343/900
  See application file for complete search history.

(56) References Cited

OTHER PUBLICATIONS

Written Opinion Issued in Patent Application No. PCT/CN2017/091766 dated Feb. 23, 2018.

\* cited by examiner

US 10,812,749 B2

DUAL-POLARIZED OMNIDIRECTIONAL ANTENNA

This is a continuation of International Application No. PCT/CN2017/091766 filed on Jul. 5, 2017 which claims priority from Chinese Patent Application No. 201710466226.4 filed on Jun. 19, 2017 and Chinese Patent Application No. 201720713462.7 filed on Jun. 19, 2017. The contents of these applications are incorporated herein by reference in their entireties.

TECHNICAL FIELD

The patent relates to the field of dual-polarized signal reception, and in particular to a dual-polarized omnidirectional antenna.

BACKGROUND ART

An antenna is a component used in a radio to transmit or receive electromagnetic waves. Engineering system, such as radio communication, broadcasting, television, radar, navigation, electronic countermeasures, remote sensing, and radio astronomy, uses electromagnetic waves to transmit information and relies on antennas for work. With the popularization of wireless digital television signals, more and more people receive television signals outdoors or on the move rather than being limited indoors. A television signal can be received outdoors especially on the move since a signal tower is fixed. However, the position of a receiving antenna is constantly changing. The television signal also includes a vertically polarized signal and a horizontally polarized signal. Therefore, it is necessary to develop an omnidirectional dual-polarized receiving antenna to ensure a better receiving effect.

SUMMARY OF THE INVENTION

In order to solve the defects in the prior art, the patent provides a dual-polarized omnidirectional antenna which can omnidirectionally receive the vertically polarized signal and the horizontally polarized signal at the same time with a good receiving effect.

The above technical problems are solved by the patent as follows. A dual-polarized omnidirectional antenna includes a vertically polarized antenna and a loop horizontally polarized antenna. The vertically polarized antenna includes a vertical fixed cover and a cylindrical antenna which is fixedly mounted in the vertical fixed cover. The horizontally polarized antenna includes a horizontal fixed cover and a loop antenna which is fixedly mounted in the horizontal fixed cover. The vertical fixed cover is fixedly mounted on the horizontal fixed cover. The cylindrical antenna receives the vertically polarized signal, and the loop antenna receives the horizontally polarized signal. The loop antenna can also receive the horizontally polarized signal omnidirectionally at the same time to ensure a better receiving effect. A wireless signal is generally transmitted in two different directions of the vertical signal and the horizontal signal in the space after being modulated by a transmitting end, and a receiving end receives the signal by the vertically polarized antenna and the horizontally polarized antenna respectively. The vertical signal and the horizontal signal may change the signal direction during transmission process in the space, which results in a loss of signal reception at the receiving end. Setting the vertically polarized antenna and the horizontally polarized antenna at the same time can minimize the loss of the received signal, because even if the signal direction changes, the resolved vector in the other direction will be received by the antenna in the other direction.

Further, the vertically polarized antenna is provided in a vertical upward direction of a center of the horizontally polarized antenna, and the horizontally polarized antenna further includes a metal shielding plate provided between the cylindrical antenna and the loop antenna. The cylindrical antenna and the loop antenna are separated by the metal shielding plate, which creates a higher polarization isolation to prevent the two antennas from interfering with each other when receiving signals.

Further, the loop antenna includes at least two layers of omnidirectional circular vibrators with one layer overlaid with the other layer. The multi-layer overlay of the omnidirectional circular vibrators can enhance signal reception on the one hand, and can set omnidirectional vibrators of different sizes for receiving signals on different bands on the other hand, and the entire vibrator can be mounted in a very small space by the layered mounting structure.

Further, one part of the omnidirectional circular vibrator is UHF horizontal receiving antenna, and the other part is VHF horizontal receiving antenna.

In this way, the loop antenna can receive both the VHF band signal and the UHF band signal to ensure a larger signal reception coverage capacity.

Further, the antenna also includes a hybrid filter amplifying circuit provided in the horizontal fixed cover. The hybrid filter amplifying circuit includes a first filter, a second filter, a third filter, a fourth filter, a first amplifier, a second amplifier, a third amplifier and a mixer. The cylindrical antenna is electrically connected to the input of the mixer through the first filter and the first amplifier sequentially. The UHF horizontal receiving antenna is electrically connected to the input of the mixer through the second filter and the second amplifier sequentially. The output of the mixer is electrically connected to the third filter. The VHF horizontal receiving antenna is electrically connected to the fourth filter. The output signals of the third filter and the fourth filter are mixed and sent into the third amplifier.

The first filter, the second filter, and the fourth filter respectively filter out the clutter received by the cylindrical antenna, the UHF horizontal receiving antenna, and the VHF horizontal receiving antenna. The signals received by the cylindrical antenna and the UHF horizontal receiving antenna is filtered and amplified, and then are mixed output by the mixer, and the third filter can further filter the clutter generated in the mixing process. Finally, the above signals are mixed, amplified and output with the signals which are filtered by the fourth filter and received by the VHF horizontal receiving antenna.

Further, the hybrid filter amplifying circuit further includes an LTE filter electrically connected to the third amplifier.

The hybrid filter amplifying circuit sets the LTE filter at the final output since the antenna more or less receives some mobile phone signals during use, so that interference from the mobile phone signal is eliminated in order to obtain a valid signal.

Further, the metal shielding plate is circular and has a diameter of 30 to 120 mm. A smaller diameter of the metal shielding plate leads to a worse isolation effect. A larger diameter can provide a better isolation effect, but the signal reception can be interfered with due to limited volume and excessive setting of diameter. The appropriate diameter range of the metal shielding plate set above can allow the metal shielding plate to provide a better shielding isolation effect (effectively reduces 50 to 80% of mutual interference) without occupying excessive area and attenuating the signal.

Further, the metal shielding plate has a thickness of 0.1 mm to 0.6 mm.

Further, the metal shielding plate is provided in parallel at a central position of the horizontally polarized antenna, and is perpendicular to the vertically polarized antenna, and is 15 mm to 35 mm from the loop antenna, and 5 mm to 12 mm from the cylindrical antenna. It can be seen that the metal shielding plate is closer to the cylindrical antenna. The patent tends to receive horizontally polarized television signals and is suitable for areas with more horizontally polarized signals.

Further, the horizontal cross section of the cylindrical antenna is in cross shape, and the area of the horizontal cross section increases from top to bottom. The lower end of the cylindrical antenna is connected to a feed line, and the thicker the lower end of the antenna is, the smaller the antenna input impedance changes with frequency, so that it is easier to keep impedance matching with the feed line. The operating frequency range of the antenna at this time is wider, and the signal receiving effect is good. In addition, the lower end of the cylindrical antenna is the metal shielding plate and the loop antenna, and a thicker lower end can ensure a better signal receiving capability and reduce signal shielding and interference in the cylindrical antenna by the metal shielding plate and the loop antenna.

Compared with the prior art, the beneficial effects of the patent are as follows.

The reception of two differently polarized television signals can be ensured with omnidirectional reception and good receiving effect by setting the vertically polarized antenna and the loop horizontally polarized antenna.

DESCRIPTION OF EMBODIMENTS

Figure 1:
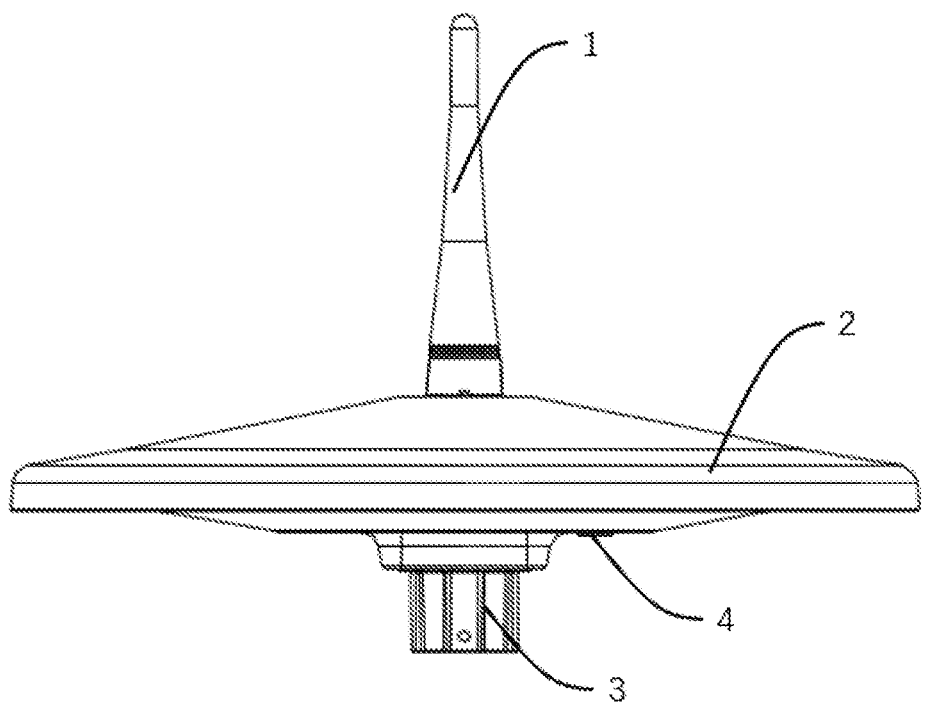
FIG. 1 is a front view of the patent.
Figure 2:
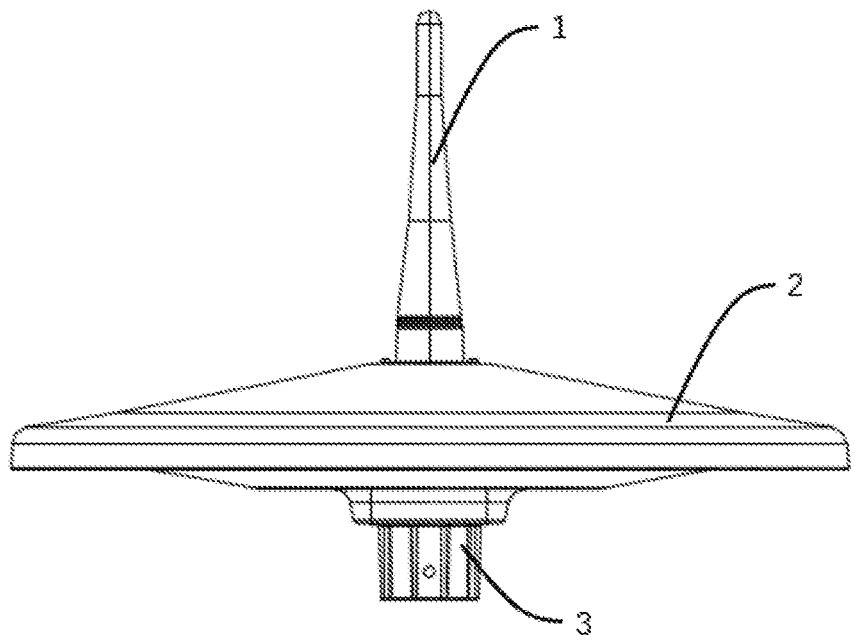
FIG. 2 is a left view of the patent.
Figure 3:
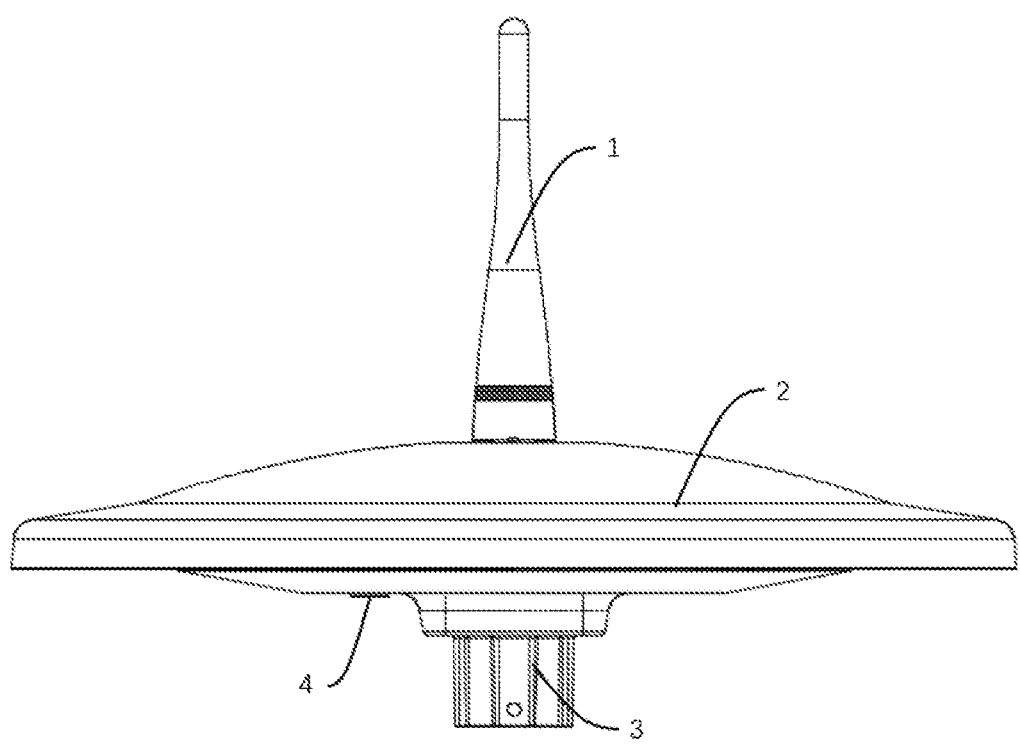
FIG. 3 is a rear view of the patent.

The patent will be described in detail below with reference to specific embodiments and drawings.

As shown in FIGS. 1 to 10, a dual-polarized omnidirectional antenna includes a vertically polarized antenna 1 and a loop horizontally polarized antenna 2. The vertically polarized antenna 1 includes a cylindrical vertical fixed cover 10 and a cylindrical antenna 100 which is mounted in the vertical fixed cover 10. The loop horizontally polarized antenna 2 includes a disk-like horizontal fixed cover 20 and a loop antenna 200. The loop antenna 200 includes an upper-layer omnidirectional circular vibrator 208 and a lower-layer omnidirectional circular vibrator 209. The cylindrical antenna 100 is mounted in the vertical fixed cover 10 which is mounted at a central position above the horizontal fixed cover 20. A support 3 is provided at a lower center of the horizontal fixed cover 20, and a connector lug 4 is further provided on one side of the support 3.

In the specific implementation process, the horizontal fixed cover 20 has a diameter of 479.85 mm and an error range is about 10 mm; the vertical fixed cover 10 has a height of 205 mm and the error range is about 5 cm; and the cylindrical antenna 100 has a height of 138 mm and the error range is about 3 cm.

Figure 7:
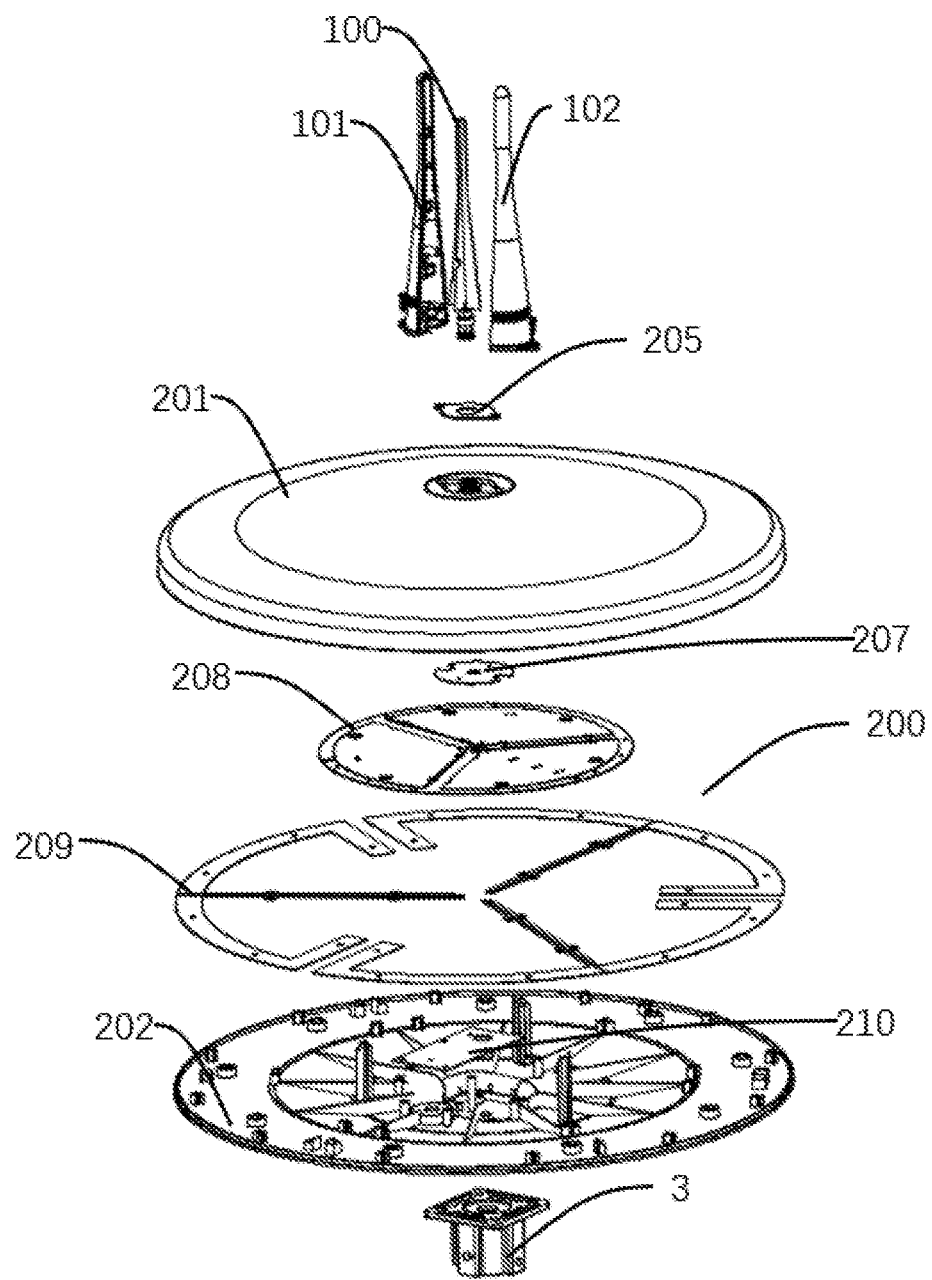
FIG. 7 is a structural disassembled view of the patent.
Figure 8:
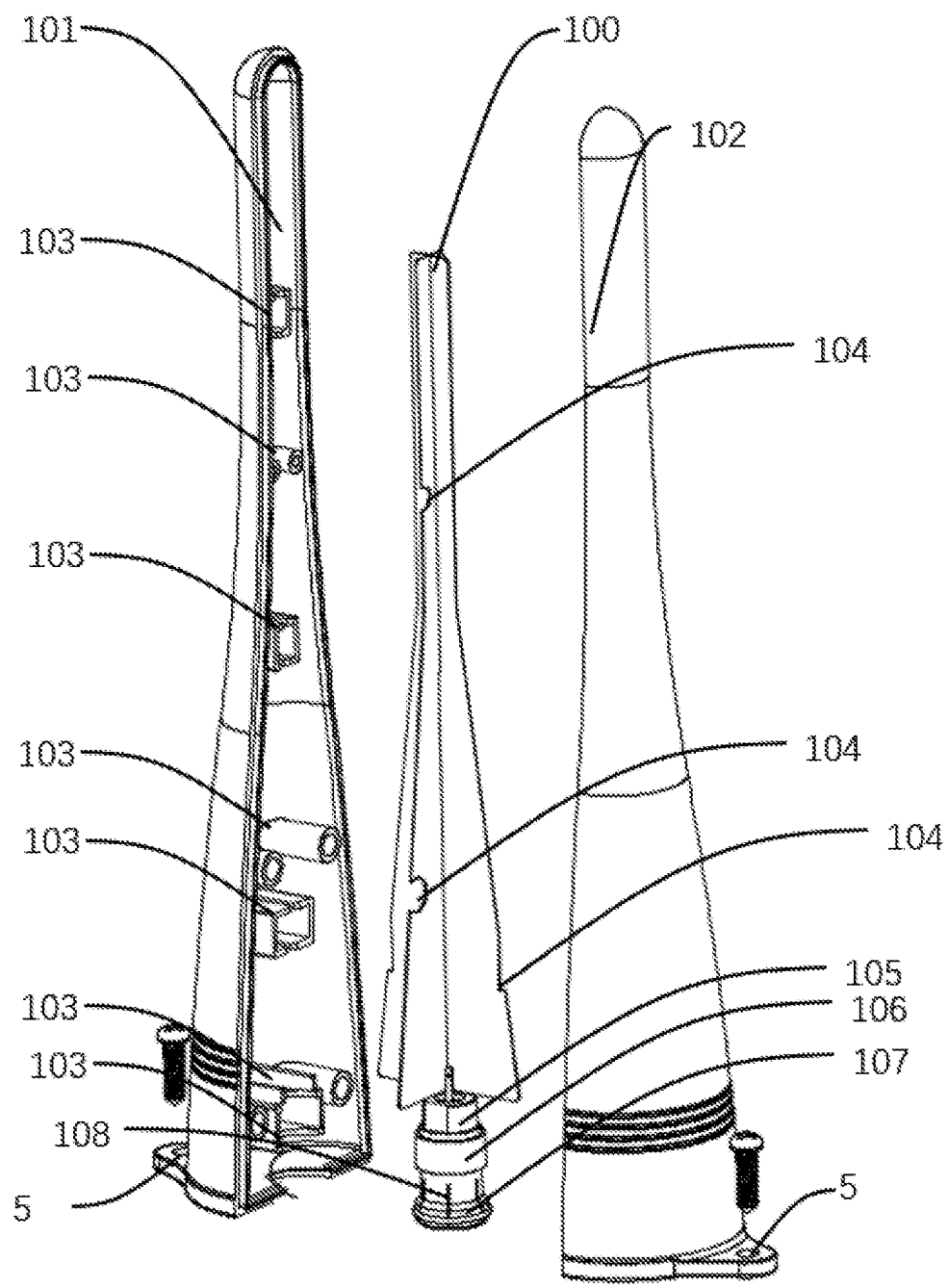
FIG. 8 is a structural disassembled enlarged view of the vertically polarized antenna in the patent.
Figure 9:
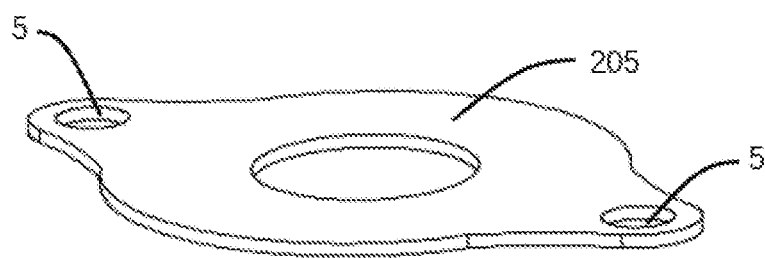
FIG. 9 is a schematic view of a waterproof rubber ring in the patent.
Figure 10:
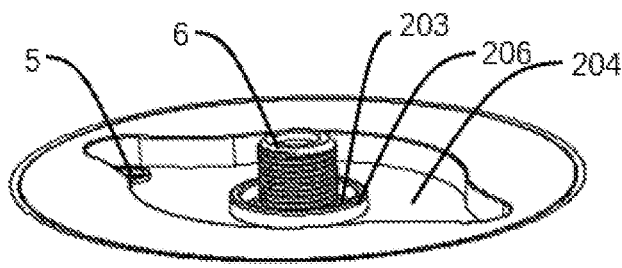
FIG. 10 is a structural schematic view of a central portion above an upper housing in the patent.

As shown in FIG. 7 showing an internal structure in the dual-polarized omnidirectional antenna, the vertical fixed cover 10 is formed by splicing a left housing 101 and a right housing 102, and the horizontal fixed cover 20 is formed by splicing an upper housing 201 and a lower housing 202.

The left housing 101 and the right housing 102 are correspondingly provided with a clamping portion 103 for fixing the cylindrical antenna 100. A gap 104 corresponding to the clamping portion 103, and a square connector 105 and a cylindrical connector 106 which are provided at the bottom end are provided on the cylindrical antenna 100. The horizontal cross section of the cylindrical antenna 100 is in cross shape and is divided into two sections from top to bottom. The horizontal section area of the upper section is constant, and the horizontal section area of the lower section continuously increases from top to bottom. The clamping portion 103 of the left housing 101 engages the clamping portion 103 of the right housing 102 at the gaps 104 during splicing, which also confines the positions of the square connector 105 and the cylindrical connector 106, so that the cylindrical antenna 100 cannot rotate and move up and down, thereby enhancing structural stability.

The bottom end of the cylindrical antenna 100 is provided with a screw hole 107, and a crack 108 extending upward from the bottom end of the cylindrical antenna 100 is provided on the side wall of the screw hole 107. Correspondingly, the upper housing 201 is provided with a through hole 203, a fixing groove 204 and a waterproof rubber ring 205 placed on the fixing groove 204. The through hole 203 is provided in the middle of the fixing groove 204, and is surrounded by a protruded step 206. A metal connector 6 locked by a hexagon nut is provided in the middle of the through hole 203 for electrically connecting with the cylindrical antenna 100. A through hole corresponding to the metal connector 6 is provided in the middle of the waterproof rubber ring 205. The bottom end of the cylindrical antenna 100 is screwed to the metal connector 6 through the screw hole 107 during installation. At this point, the side wall of the screw hole 107 is in interference fit with the step 206 to compress the crack 108 at the bottom end of the cylindrical antenna 100. The bottom ends of the left housing 101 and the right housing 102 are further provided with housing fixing screw holes 5. Correspondingly, the waterproof rubber ring 205 and the upper housing 201 are respectively provided with a housing fixing screw hole 5. The spliced left housing 101 and the right housing 102 are fixed to the upper housing 201 by screwing screws into the housing fixing screw holes 5 during installation.

The above settings of both the waterproof rubber ring 205 and the step 206 create a good waterproof effect to prevent rainwater from penetrating into the bottom end of the cylindrical antenna 100 in rainy days, which interferes with signal reception.

A metal shielding plate 207, an upper-layer omnidirectional circular vibrator 208, a lower-layer omnidirectional circular vibrator 209, and a circuit board 210 are sequentially mounted in the horizontal fixed cover 20 from top to bottom, wherein the upper-layer omnidirectional circular vibrator 208 is a UHF horizontal receiving antenna, the lower-layer omnidirectional circular vibrator 209 is a VHF horizontal receiving antenna, and the cylindrical antenna 100 is a UHF vertical receiving antenna. In addition, the horizontal section area of the lower section of the cylindrical antenna 100 continuously increases from top to bottom, that is, the end of the cylindrical antenna 100 which is closer to the metal shielding plate 207 has a stronger ability to receive signals, thereby further reducing the signal shielding and interference in the cylindrical antenna 100 by the metal shielding plate 207 and the loop antenna 200. The influence of the low frequency signal on the high frequency signal is obvious according to the signal interference principle. On the contrary, the influence of the high frequency signal on the low frequency signal is not large. A superposition method of increasing the diameter from top to bottom is used for the above two omnidirectional circular vibrators receiving signals of different bands, which not only reduces the signal interference, but also improves structural stability with a lower center of gravity.

Figure 11:
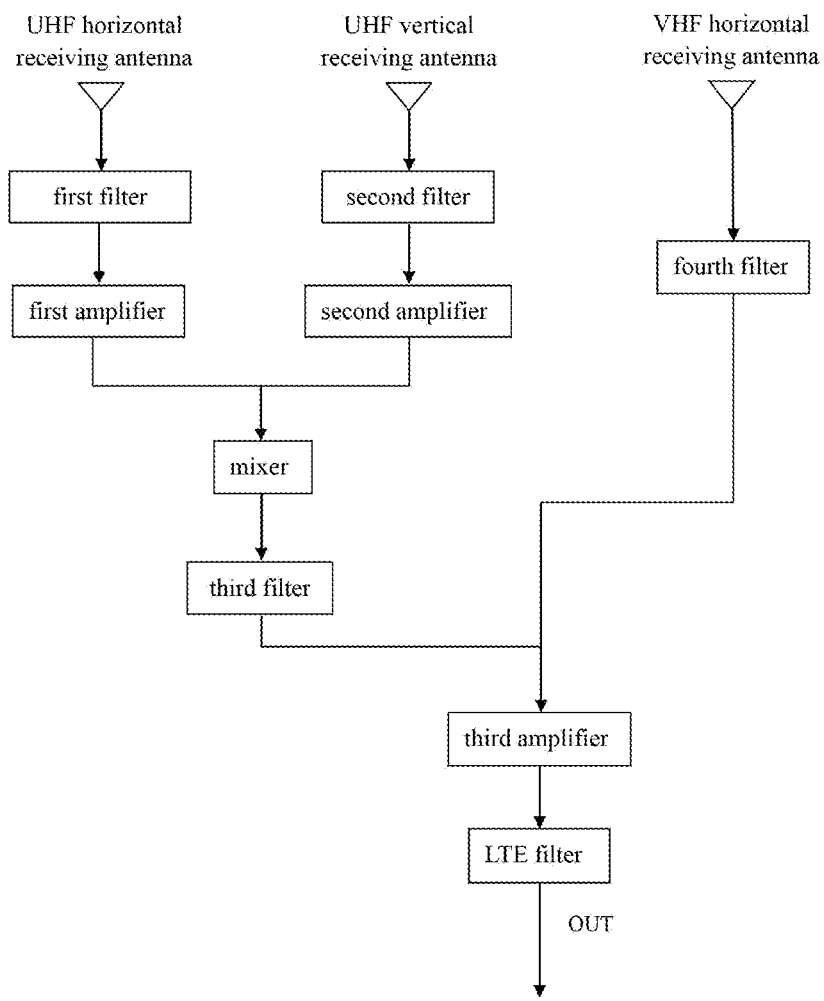
FIG. 11 is a block diagram of a circuit module in the patent.

As shown in FIG. 11, a hybrid filter amplifying circuit is provided on the circuit board 210. The hybrid filter amplifying circuit includes a first filter, a second filter, a third filter, a fourth filter, a first amplifier, a second amplifier, a third amplifier, an LTE filter for filtering mobile phone signals and a mixer. The UHF vertical receiving antenna (cylindrical antenna 100) is electrically connected to one input of the mixer through the first filter and the first amplifier sequentially. The UHF horizontal receiving antenna (upper-layer omnidirectional circular vibrator 208) is electrically connected to the other input of the mixer through the second filter and the second amplifier sequentially. The input of the mixer is electrically connected to the third filter. The VHF horizontal receiving antenna (lower-layer omnidirectional circular vibrator 209) is electrically connected to the fourth filter. The third filter and the fourth filter are both electrically connected to the input of the third amplifier, and the output of the third amplifier is electrically connected to the connector lug 4 through the LTE filter.

The first filter, the second filter, and the fourth filter respectively filter out the clutter received by the UHF vertical receiving antenna (cylindrical antenna 100), the UHF horizontal receiving antenna (upper-layer omnidirectional circular vibrator 208), and the VHF horizontal receiving antenna (lower-layer omnidirectional circular vibrator 209). The signal received by the UHF vertical receiving antenna (cylindrical antenna 100) and the UHF horizontal receiving antenna (upper-layer omnidirectional circular vibrator 208) is filtered and amplified, and then are mixed output by the mixer. The third filter can further filter the clutter generated in the mixing process. Finally, the above signals are mixed, amplified and output with the signals which are filtered by the fourth filter and received by the VHF horizontal receiving antenna (lower-layer omnidirectional circular vibrator 209).

The first filter, the second filter and the third filter are all high-pass filters, the fourth filter is a low-pass filter, and the first amplifier and the second amplifier are both low-noise amplifiers.

In the specific implementation process, the metal shielding plate 207 has a diameter of 60 mm. A smaller diameter of the metal shielding plate 207 leads to a worse isolation effect. A larger diameter can provide a better isolation effect, but the signal reception can be interfered with due to limited volume and excessive setting of diameter. The appropriate diameter range of the metal shielding plate 207 set above can allow the metal shielding plate 207 to provide a better shielding isolation effect (effectively reduces 50 to 80% of mutual interference) without occupying excessive area and attenuating the signal. The metal shielding plate 207 has a thickness of 0.3 mm, and is 26.35 mm from the loop antenna 200, and 9 mm from the cylindrical antenna 100. It can be seen that the metal shielding plate 207 is closer to the cylindrical antenna 100. The embodiment tends to receive horizontally polarized television signals and is suitable for areas with more horizontally polarized signals.

The height of the cylindrical antenna 100 is 138 mm, the height of the vertical fixed cover 10 is 205 mm, and the vertical fixed cover 10 is about one fourth higher than the cylindrical antenna 100, so the setting ensures a larger buffer space of the cylindrical antenna 100 in the vertical fixed cover 10 and enhances the stability of the cylindrical antenna 100 under vibration.

Figure 4:
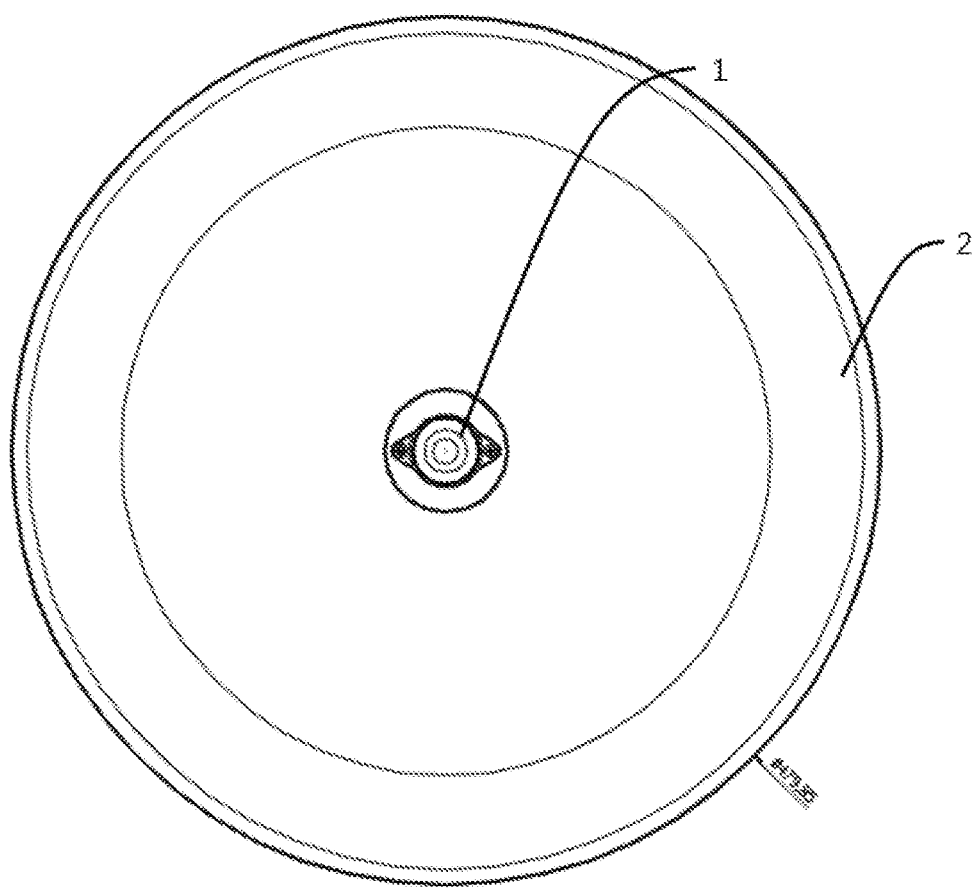
FIG. 4 is a plan view of the patent.
Figure 5:
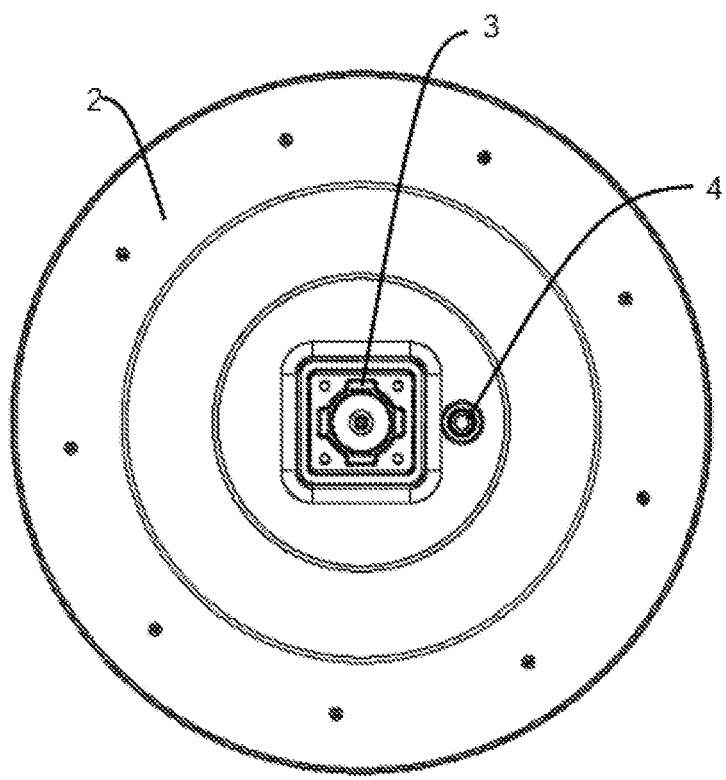
FIG. 5 is a bottom view of the patent.
Figure 6:
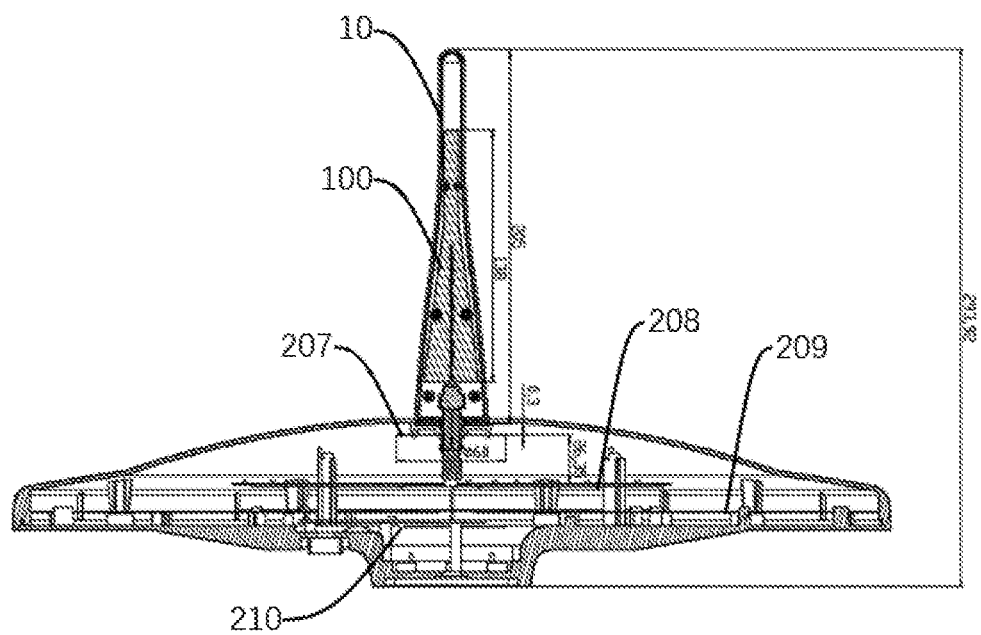
FIG. 6 is a sectional view of the patent.

The overall height of the embodiment is 293.92 mm, and the width (that is, the diameter of the horizontal fixed cover 20 shown in FIG. 4) is 479.85 mm, which allows being picked up by one hand, thus it is convenient to carry and to be used outdoors.

Figure 12:
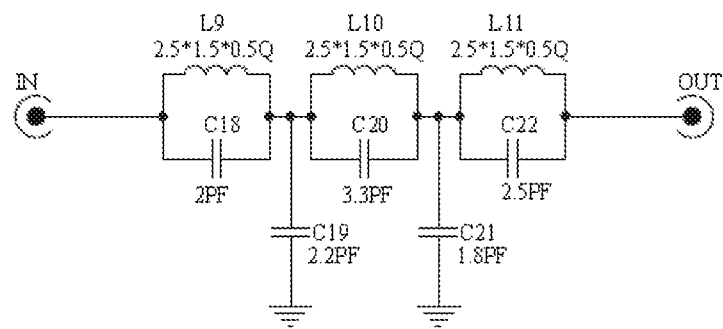
FIG. 12 is a circuit diagram of an LTE filter circuit in the patent.

As shown in FIG. 12, the LTE filter includes inputs which are sequentially connected in series, a first group of inductors L9 and a capacitor C18 which are connected in parallel, a first group of inductors L10 and a capacitor C20 which are connected in parallel, and a third group of inductors L10 and a capacitor C20 which are connected in parallel, and an output. The node between the first group of parallel circuits and the second group of parallel circuits is grounded through a capacitor C19, and the node between the second group of parallel circuits and the third group of parallel circuits is grounded through a capacitor C21, wherein the parameter of all the inductors L9, L10 and L11 is 10 to 18 NH (2.5*1.5*0.5Q), and the parameters of capacitors C18, C19, C20, C21 and C22 are 2 PF, 2.2 PF, 3.3 PF, 1.8 PF and 2.5 PF respectively.

Figure 13:
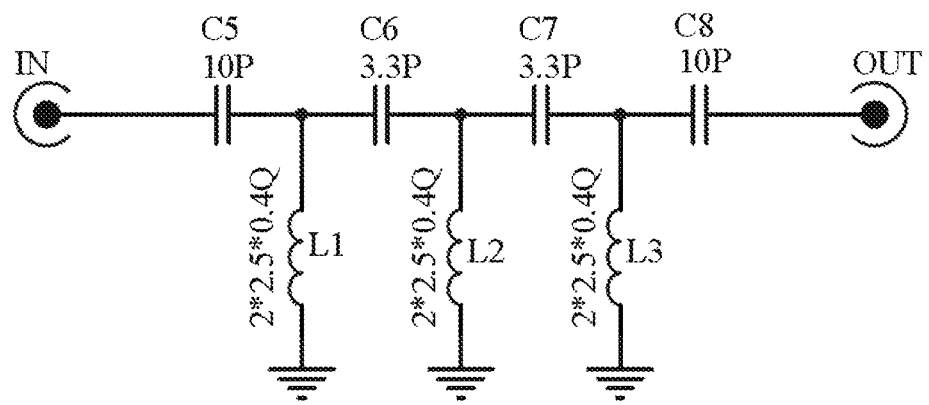
FIG. 13 is a circuit diagram of a high-pass filter in the patent.

As shown in FIG. 13, the high-pass filter includes an input, a capacitor C5, a capacitor C6, a capacitor C7 and an output which are connected in series, and the nodes between the capacitors are grounded through inductors L1, L2 and L3 respectively, wherein the parameters of capacitors C5, C6, C7 and C8 are 10 P, 3.3 P, 3.3 P and 10 P respectively, and the parameter of all the inductors L1, L2 and L3 is 10 to 22 NH (2*2.5*0.4Q).

Figure 14:
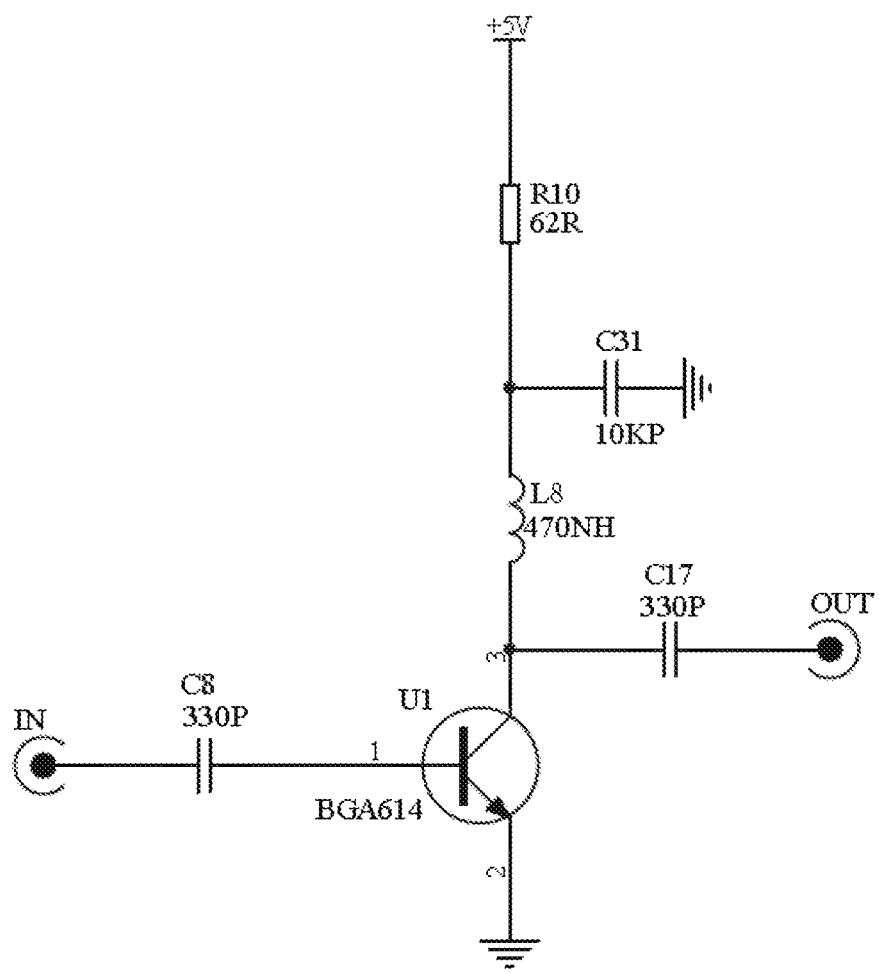
FIG. 14 is a circuit diagram of an amplifier in the patent.

As shown in FIG. 14, the third amplifier includes a resistor R10, a capacitor C31, a capacitor C17, a capacitor C8, an inductor L8, and a triode U1. The input of the third amplifier is electrically connected to the base of the triode U1 through the capacitor C8, the +5V power source terminal is connected to one end of the resistor R10, and the other end of the resistor R10 is grounded through a capacitor C31 and is connected to one end of the inductor L8. The other end of the inductor L8 is connected to one end of the capacitor C17 and the collector of the triode U1 respectively, and the other end of the capacitor C17 is connected to the output. The emitter of the triode is grounded, and in particular, the triode U1 is BGA 614, wherein the resistor R10 is 62 S2, the capacitors C31, C17, and C8 are 10 KPF, 330 PF, and 330 PF respectively, and the parameter of inductor L8 is 470 NH.

Figure 15:
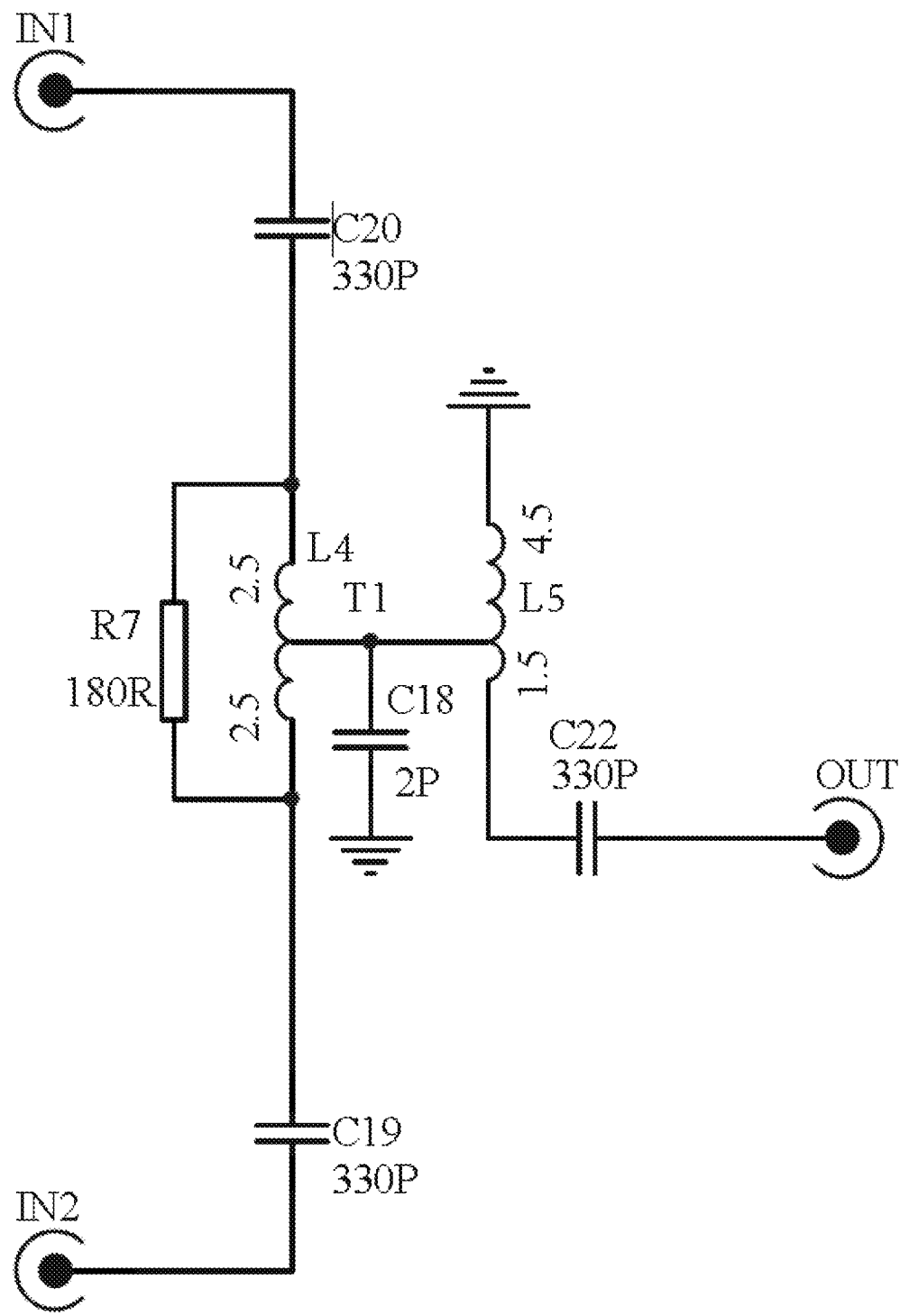
FIG. 15 is a circuit diagram of a mixer in the patent.

As shown in FIG. 15, the mixer includes a resistor R7, a capacitor C20, a capacitor C18, a capacitor C22, a capacitor C19, a magnetic-core inductor L4, and a magnetic-core inductor L5. The two inputs of the mixer are respectively connected to one end of the capacitor C20 and the capacitor C19, and the other ends of the capacitor C20 and the capacitor C19 are respectively connected to both ends of the magnetic-core inductor L4, and the both ends of the magnetic-core inductor L4 are connected in parallel to the resistor R7 (the resistor R7 and the magnetic-core inductor L4 here can increase the isolation of two input signals by about 15 to 30 dB, which can greatly reduce the mutual interference between the two signals). Five windings are provided on the magnetic-core inductor L4 and the magnetic-core inductor L5 respectively. The node T1 in FIG. 15 is respectively connected to the intermediate node of the windings of the magnetic-core L4 and the node which divides the windings of the magnetic-core inductor L5 into two parts with a proportion of 1:3 (or 1:4). The node T1 is grounded through the capacitor C18. One end of the magnetic-core inductor L5 with a proportion of 3 (or 4) is grounded, and the other end with a proportion of 1 is connected to one end of the capacitor C22, and the other end of the capacitor C22 is connected to the output, wherein the resistor R7 is 180 S2, the capacitors C20, C18, C22, and C19 are 330 PF, 2 PF, 330 PF and 330 PF respectively.

Figure 16:
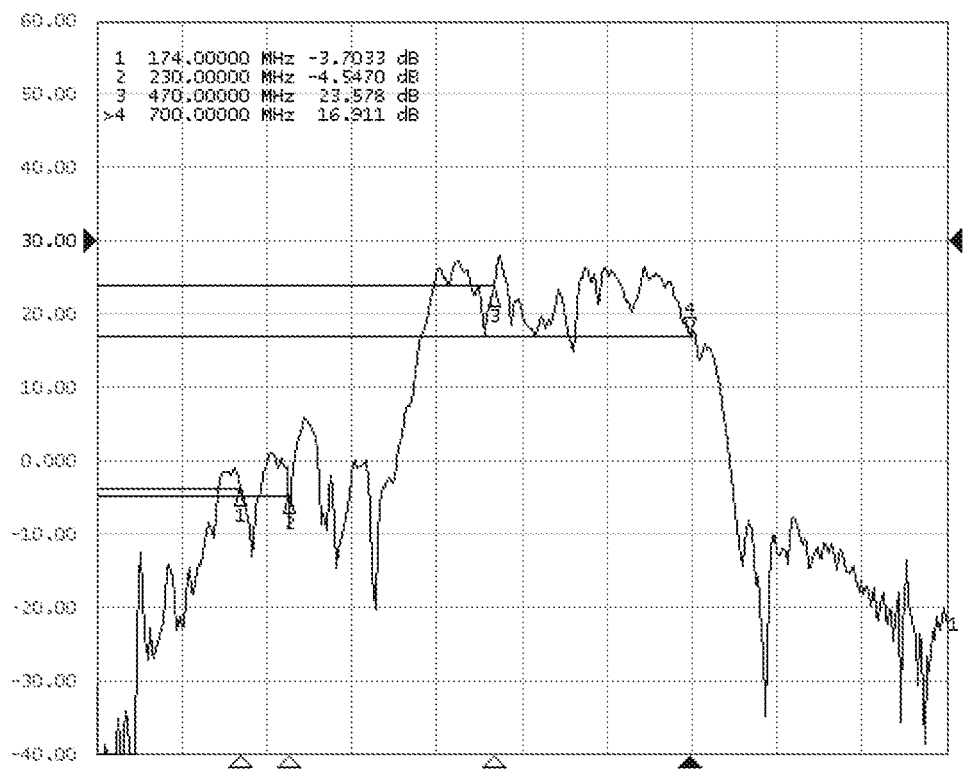
FIG. 16 is a receiving oscillogram of a cylindrical antenna in the patent.
Figure 17:
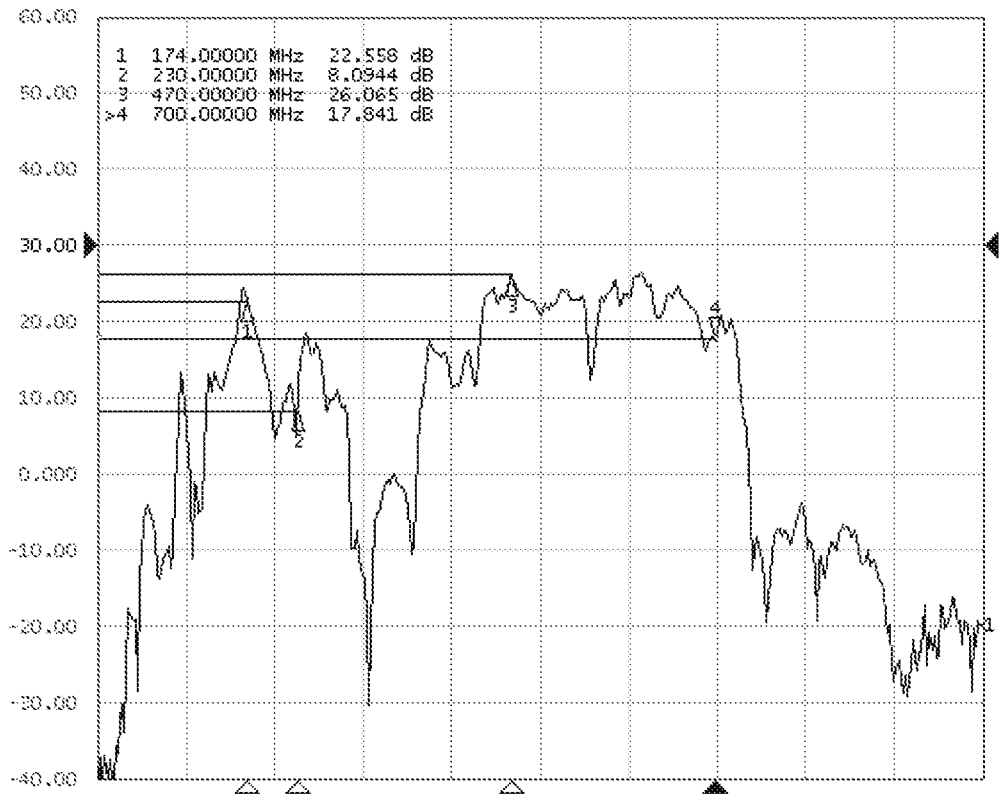
FIG. 17 is a receiving oscillogram of a loop antenna in the patent.
Figure 18:
FIG. 18 is a general receiving oscillogram of the patent.
Figure 19:
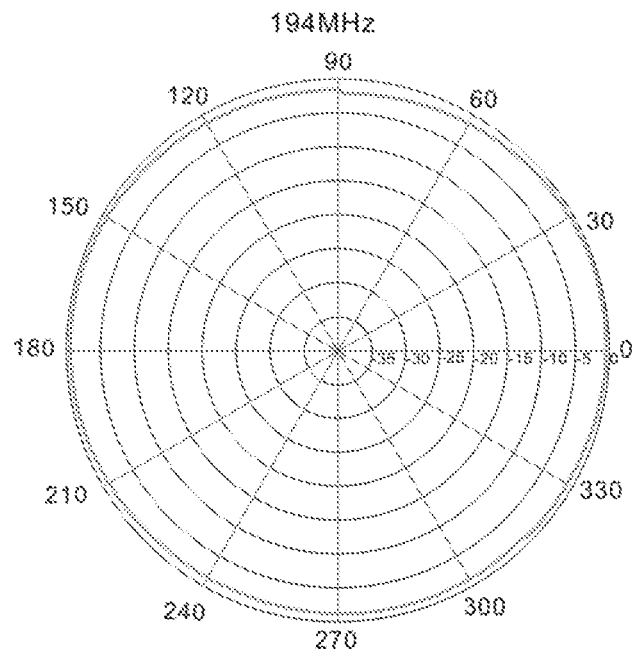
FIG. 19 is a horizontal plane radiation pattern of the patent on 194 MHz band.
Figure 20:
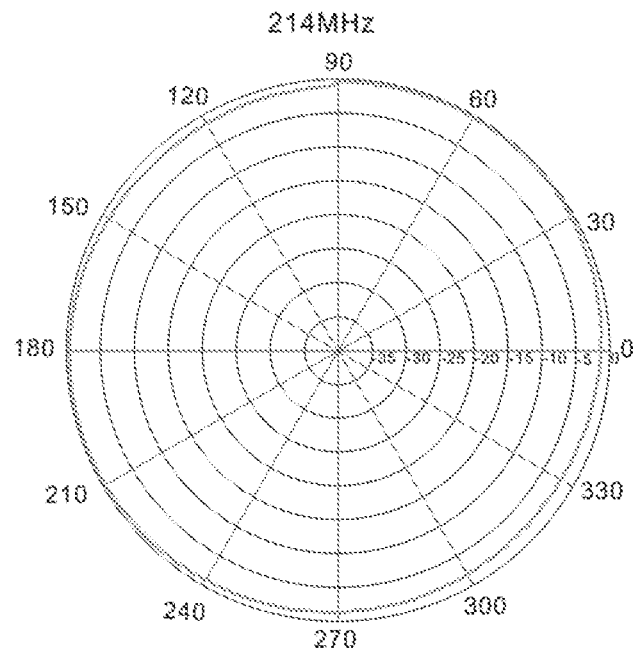
FIG. 20 is a horizontal plane radiation pattern of the patent on 214 MHz band.
Figure 21:
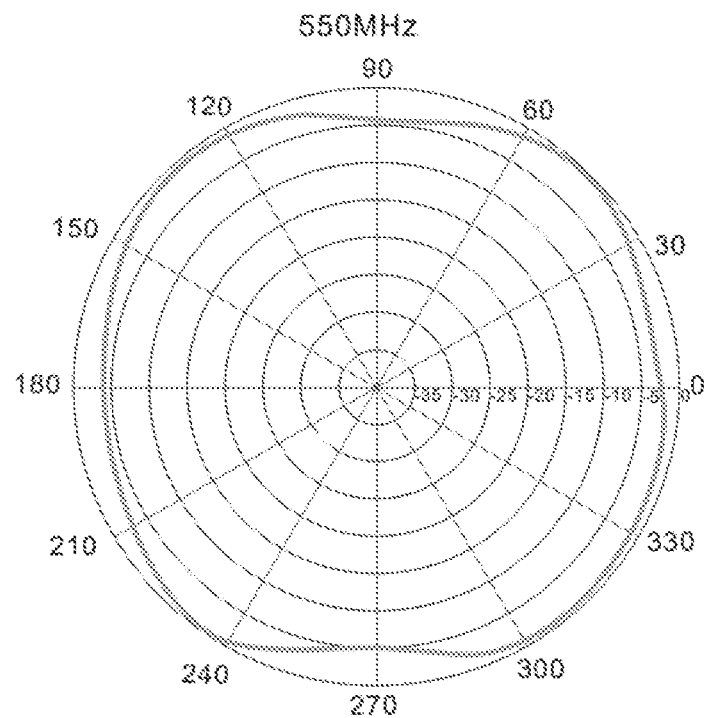
FIG. 21 is a horizontal plane radiation pattern of the patent on 550 MHz band.
Figure 22:
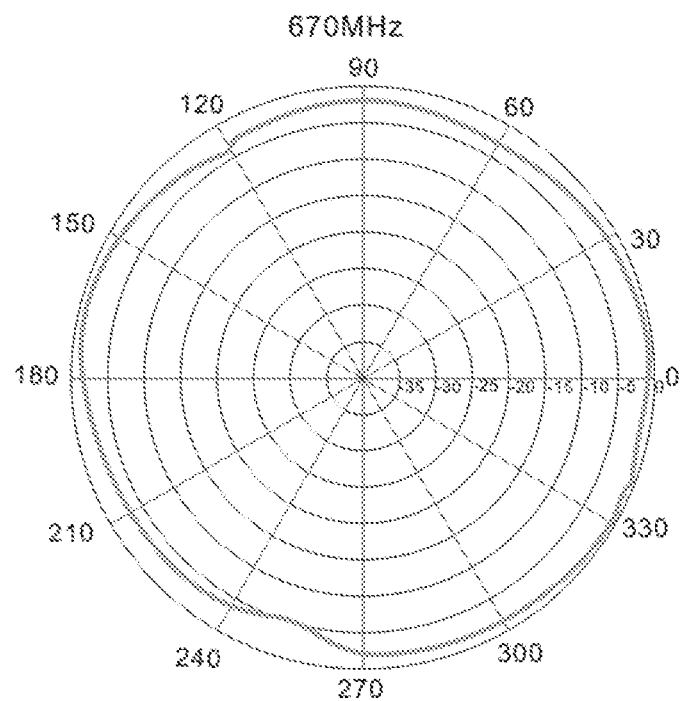
FIG. 22 is a horizontal plane radiation pattern of the patent on 670 MHz band.

As shown in FIGS. 16, 17 and 18, a oscillogram showing the cylindrical antenna 100 receives signals, a oscillogram of the loop antenna 200, and a oscillogram of the embodiment are shown, in which four points are selected for comparison and are respectively 174 MHz, 230 MHz, 470 MHz, and 700 MHz, wherein 174 MHz to 230 MHz belong to the VHF band, and 470 MHz to 700 MHz belong to the UHF band. It can be seen that the gain of 174 MHz in the embodiment is 25.915 dB, the gain of 230 MHz is 11.989 dB, the gain of 470 MHz is 24.873 dB, and the gain of 700 MHz is 26.404 dB, so the gain is level to or higher than the gain for receiving signals by using the cylindrical antenna 100 or the loop antenna 200 alone, so that a compensating effect for signals can be provided by setting the cylindrical antenna 100 and the loop antenna 200 together. The specific principle is that the horizontally polarized signal and the vertically polarized signal can be converted mutually during the reflection process. In addition, it can be seen from the three drawings that the gain of the band above 700 MHz is negative, that is, the high-pass filter filters the band above 700 MHz since broadcast signals on the band above 700 MHz are not used in most regions.

Figure 23:
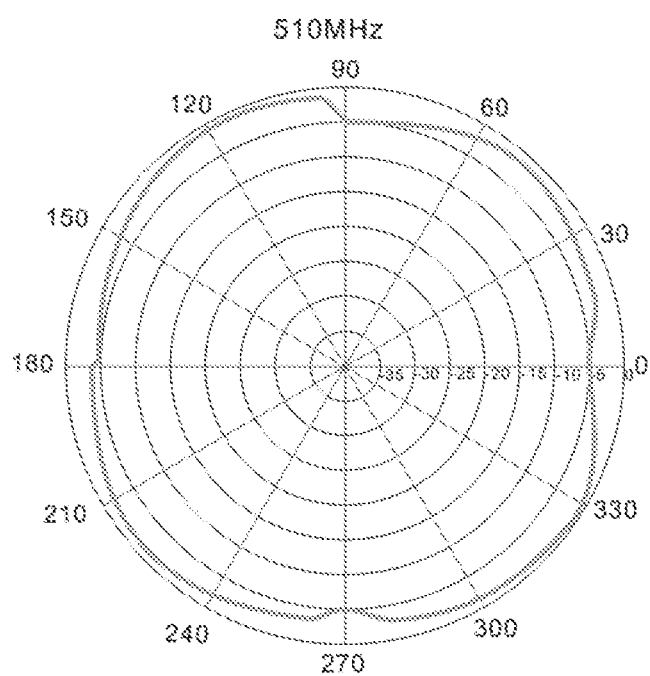
FIG. 23 is a vertical plane radiation pattern of the patent on 510 MHz band.
Figure 24:
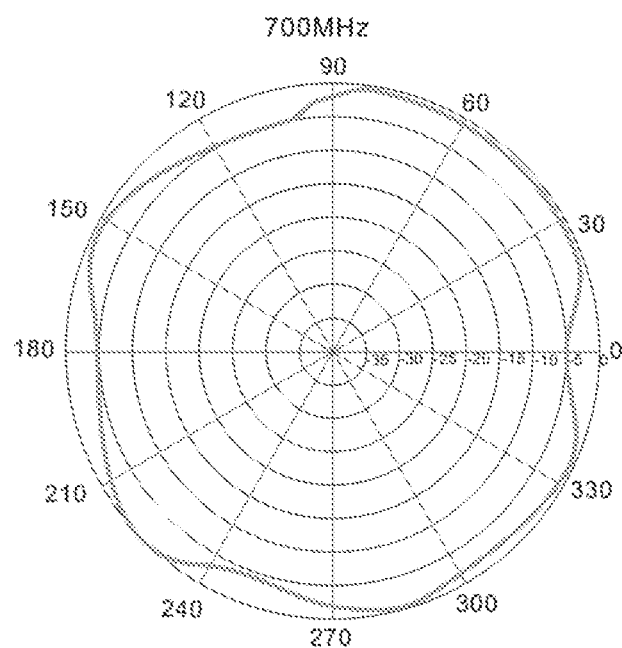
FIG. 24 is a vertical plane radiation pattern of the patent on 700 MHz band.

As shown in FIGS. 19 to 22, horizontal plane radiation patterns in the patent with receiving frequencies of 194 MHz, 214 MHz, 550 MHz, and 670 MHz respectively are shown. As shown in FIGS. 23 to 24, vertical plane radiation patterns in the patent with receiving frequencies of 510 MHz and 700 MHz respectively. It can be seen that the radiation field strength distribution of the antenna in each direction is relatively uniform. The patent achieves omnidirectional reception of signals at various frequencies.

The invention claimed is:

1. A dual-polarized omnidirectional antenna, comprising: a vertically polarized antenna and a loop horizontally polarized antenna, wherein the vertically polarized antenna includes a vertical fixed cover and a cylindrical antenna which is fixedly mounted in the vertical fixed cover, the horizontally polarized antenna includes a horizontal fixed cover and a loop antenna which is fixedly mounted in the horizontal fixed cover, and the vertical fixed cover is fixedly mounted on the horizontal fixed cover.

2. The dual-polarized omnidirectional antenna according to claim 1, wherein the vertically polarized antenna is provided in a vertical upward direction of a center of the horizontally polarized antenna, and the horizontally polarized antenna further includes a metal shielding plate provided between the cylindrical antenna and the loop antenna.

3. The dual-polarized omnidirectional antenna according to claim 2, wherein the loop antenna includes at least two layers of omnidirectional circular vibrators with one layer overlaid with the other layer.

4. The dual-polarized omnidirectional antenna according to claim 3, wherein one part of the omnidirectional circular vibrator is a UHF horizontal receiving antenna and the other part is a VHF horizontal receiving antenna.

5. The dual-polarized omnidirectional antenna according to claim 4, wherein the antenna further includes a hybrid filter amplifying circuit provided in the horizontal fixed cover in which the hybrid filter amplifying circuit includes a first filter, a second filter, a third filter, a fourth filter, a first amplifier, a second amplifier, a third amplifier and a mixer, the cylindrical antenna is electrically connected to an input of the mixer through the first filter and the first amplifier sequentially, the UHF horizontal receiving antenna is electrically connected to the input of the mixer through the second filter and the second amplifier sequentially, an output of the mixer is electrically connected to the third filter, the VHF horizontal receiving antenna is electrically connected to the fourth filter, and the outputs of the third filter and the fourth filter are both electrically connected to the third amplifier.

6. The dual-polarized omnidirectional antenna according to claim 5, wherein the hybrid filter amplifying circuit further includes an LTE filter electrically connected to the third amplifier.

7. The dual-polarized omnidirectional antenna according to claim 2, wherein the metal shielding plate is circular and has a diameter of 30 to 120 mm.

8. The dual-polarized omnidirectional antenna according to claim 2, wherein the metal shielding plate has a thickness of 0.1 mm to 0.6 mm.

9. The dual-polarized omnidirectional antenna according to claim 2, wherein the metal shielding plate is provided in parallel at a central position of the horizontally polarized antenna and is perpendicular to the vertically polarized antenna, and is 15 mm to 35 mm from the loop antenna and 5 mm to 12 mm from the cylindrical antenna.

10. The dual-polarized omnidirectional antenna according to claim 1, wherein a horizontal cross section of the cylindrical antenna is in cross shape, and an area of the horizontal cross section increases from top to bottom.

* * * * *